Patented July 31, 1945

2,380,409

UNITED STATES PATENT OFFICE 2,380,409

PRODUCTION OF VITAMIN CONCENTRATES

Loran O. Buxton, Newark, N. J., assignor to National Oil Products Company, Harrison, N. J., a corporation of New Jersey No Drawing. Application July 13, 1942,
Serial No. 450,760

9 Claims. (Cl. 167—81)

This invention relates to vitamin concentrates, more particularly to improved concentrates of natural vitamin esters.

It is well known that concentrates of fat-soluble vitamins, e. g. vitamins A and D, may be prepared by saponifying vitamin-containing oils and extracting the vitamin alcohols from the resultant soaps. These vitamin alcohols may be used as such for vitamin concentrates either in capsules or in other convenient forms. In some instances such vitamin alcohols are dissolved in a foreign oil, such as corn oil, or the like, the idea being to provide a bland oil containing relatively large amounts of vitamins without having any undesirable tastes and odors associated therewith. However, such proposals have not proved to be entirely satisfactory, since much of the undesirable taste and odor associated with the original vitamin-containing oil are concentrated with the vitamin alcohols and are added to the foreign oil along with the vitamins. Furthermore, the vitamin alcohols do not appear to be as stable as the natural ester forms of the vitamins which are present in the original vitamin-containing oil. It has been proposed to produce concentrates of the natural vitamin esters by high vacuum distillation of the vitamin-containing oils. However, in this instance the undesirable taste and odor constituents are to a large extent concentrated with the vitamin esters and thus the product which is obtained has a certain amount of undesirable tastes and odors. Furthermore, any vitamin alcohols present in the original oil will also be distilled along with the vitamin esters and tend to lower the stability and utility of the resultant vitamin ester concentrate. Another suggestion has been to produce concentrates of fat-soluble vitamin alcohols and then convert the vitamin alcohols to vitamin esters by esterification with fatty acid anhydrides and acid chlorides, e. g. acetic anhydride, acetyl chloride, palmityl chloride, oleyl chloride, etc. These synthetic vitamin esters are, in most cases, not nearly as desirable as the natural vitamin esters. Also in most instances it is practically impossible to obtain complete esterification of the vitamin alcohols and thus a substantial portion of the concentrate consists of unesterified vitamin alcohols which as in the case of the previously mentioned concentrates will tend to lower the stability and utility thereof. Furthermore, the impurities originally associated with the vitamin alcohols will be present in the mixture of synthetic vitamin esters and unesterified vitamin alcohols. There is still a great demand for improved concentrates of natural vitamin esters, particularly concentrates of natural vitamin A esters.

It is the object of this invention to provide an improved process for the production of concentrates of fat-soluble vitamin esters.

It is a further object of this invention to provide a process for the production of substantially odorless, bland, vitamin A and/or D concentrates in which the vitamins are present in their natural ester forms.

Other objects of the invention will in part be obvious and will in part appear hereinafter.

I have discovered that highly improved concentrates of fat-soluble vitamins in which the vitamins are present in their naturally-occurring ester forms may be readily prepared by contacting a fat-soluble vitamin containing marine oil at a temperature above room temperature, with a liquid, aliphatic, organic solvent miscible with fatty materials at temperatures above room temperature and partially immiscible therewith at temperatures below room temperature, cooling the mixture to a temperature below room temperature, separating a solvent solution of a concentrate of fat-soluble vitamin esters and alcohols from the remainder of the oil, hereinafter referred to as the "semi-concentrate," recovering the semi-concentrate from the solvent solution thereof, contacting the semi-concentrate with a highly polar solvent substantially immiscible with the semi-concentrate at room temperature or temperatures above room temperature, cooling the mass, separating the solvent and the material dissolved therein including the vitamin alcohols from the resulting ester concentrate and then removing any entrapped solvent from the ester concentrate. The highly polar solvent may readily be separated from the material dissolved therein to recover the vitamin alcohols which were present in the semi-concentrate. Substantially all of the free fatty acids and odor and taste constituents contained in the semi-concentrate will be removed along with the vitamin alcohols. Also a large part of the coloring matter contained in the semi-concentrate will be removed by the treatment with the highly polar solvent. Thus a highly potent, light-colored, bland, substantially odorless concentrate of natural vitamin esters containing practically no free fatty acids will be obtained. An alternative form of the invention, though a much less preferred one, comprises extracting the vitamin-containing oil with the highly polar solvent first, and then subsequently contacting the residual oil with a solvent such as is employed in the first step of the preferred form of the invention to produce the vitamin ester. Substantially as desirable a product will be obtained as when the preferred process is employed; however, much larger quantities of highly polar solvent and much more equipment will be required than when operating under the preferred process.

The invention accordingly comprises the several steps and the relation of one or more of such steps with respect to each of the others thereof, which will be exemplified in the process hereinafter disclosed, and the scope of the invention will be indicated in the claims.

The solvents which are employed in carrying out the first extraction step of the preferred process of the invention may be selected from a large group of aliphatic solvents found to be useful as a result of extensive experimentation. The choice of the solvent will depend to some extent upon the properties of the oil to be treated, as will become more evident from the detailed description hereinafter given. Results have indicated that the solvents preferably employed are members of well recognized chemical classes; it has also been found that the number of carbon atoms in the solvent to be used is a particularly important factor in determining the availability thereof for use in the practice of this invention. The following table sets forth the classes of solvents which have been found to be particularly useful in the practice of this invention:

Table

1. Aliphatic and alicyclic monohydroxy alcohols containing from 3 to 6 carbon atoms.
2. Esters formed by the reaction of aliphatic and alicyclic alcohols with aliphatic monocarboxylic acids, said esters containing not more than 8 carbon atoms.
3. Aliphatic and alicyclic aldehydes containing not more than 6 carbon atoms.
4. Aliphatic ketones containing not more than 6 carbon atoms.

Solvents falling in the classes above listed are all liquid aliphatic organic compounds having the properties of being miscible with fatty oils at temperatures above room temperature, i. e. 20° to 25° C., and partially immiscible therewith at temperatures substantially below room temperature. In addition it will be noted that the preferred solvents possess relatively low freezing points.

In order to more fully illustrate the nature of the solvents which may be employed, a partial list thereof is herewith given; it is to be understood, however, that this list is not intended to be complete, but is merely illustrative of the solvents which may be employed and which fall within the scope of the table. Thus it has been found that the following solvents may be used: n-propyl alcohol, isopropyl alcohol, n-butyl alcohol, n-amyl alcohol, isoamyl alcohol, secondary amyl alcohol, furfuryl alcohol, allyl alcohol, diacetone alcohol, acetyl methyl carbinol, β-hydroxy ethyl acetate, methyl formate, ethyl formate, ethyl acetate, methyl acetate, isopropyl acetate, glycol diformate, glycol diacetate, methyl levulinate, ethyl levulinate, methyl aceto acetate, ethyl aceto acetate, methyl furoate, vinyl acetate, furfural, propionaldehyde, crotonaldehyde, acetone, methyl ethyl ketone, acetonyl acetone and propylene chlorhydrin. Mixtures of these solvents may also be used. It will be noted that all these solvents belong to that class of aliphatic organic compounds which have the properties of being miscible with fatty oils at temperatures above room temperature and at least partially immiscible therewith at temperatures substantially below room temperature; furthermore, it will be noted that the majority of these solvents have relatively low freezing points.

Occasionally it may be found that certain of the solvents hereinabove mentioned may be too miscible with some of the oils which may be treated by this invention to effect a separation of highly potent vitamin fractions therefrom; thus, for example, acetone is too miscible with some fat-soluble vitamin-containing oils to accomplish the purposes of this invention. However, this condition may be easily corrected by diluting the solvent either with a small amount of water or with a liquid aliphatic organic solvent relatively immiscible with fatty oils. In general it may be said that the effect of diluting any of the above solvents with water will be to render the solvents more immiscible with fatty oils, so that if difficulty is encountered in effecting proper separation of the highly potent extracts from the vitamin-containing oils, this difficulty may generally be overcome by the addition of a small amount of water to the solvent.

The solvents preferably employed in the production of the semi-concentrate are the aliphatic alcohols containing from 3 to 6 carbon atoms; of these solvents isopropanol and diacetone alcohol have proved to be the most successful. The presence of the hydroxyl group seems to impart to these solvents properties which make them particularly useful for the present purposes; whether this factor is due to some activating influence possessed by this group is not known, but it is believed that the presence of the hydroxyl group in such solvents makes them more capable of extracting the vitamins from oils containing the same.

In carrying out the second step of the process of the invention the semi-concentrate produced by the first extraction step is extracted with a highly polar solvent substantially immiscible with the semi-concentrate at room temperature or temperatures above room temperature. The term "polar solvent" is employed herein to connote an organic solvent containing a polar functional grouping, i. e. a functional grouping which tends to produce an unbalanced electronic structure and thereby activate the molecule and impart a characteristic dipole moment thereto; examples of such polar functional groupings are the hydroxyl group, the carbonyl group, and the ester grouping.

Such highly polar solvents which may be used in carrying out the second step of the process of the invention include, inter alia, methyl alcohol, ethyl alcohol, isopropyl alcohol, n-propyl alcohol, acetone, diacetone alcohol, ethyl acetate, methyl acetate, and methyl ethyl ketone, the last seven named solvents all containing at least 9% of water. Methyl alcohol and ethyl alcohol may contain any suitable percentage of water or no water at all if desired. Suitable mixtures of the above solvents may also be used. It will be noted that seven of the solvents included in the group preferably employed in the refining step may also be employed in the first extraction step of the process. However, in the first extraction step the solvents contain relatively little water; but when employed in the second extraction step, they contain at least 9% and frequently more than 9% of water whereby their miscibility with the vitamin esters is greatly reduced. The polar solvents which I prefer to employ in the practice of the present invention are methyl and ethyl alcohol and 85% to 91% aqueous isopropanol. A solvent sold under the trademark "Solox" by Industrial Alcohol Co. has been found to be quite efficacious in practicing this invention. The vitamin alcohols and odor and taste constituents which it is desired to extract from the semi-concentrate are soluble in these solvents at room temperature, whereas the vitamin esters themselves are immiscible therewith or relatively so. These solvents have proved to be very successful in the practice of this invention.

In carrying out the process of the invention the fat-soluble vitamin-containing marine oil to be treated is first mixed with the particular solvent to be employed in producing the semi-concentrates. The oil treated may be any of the marine oils containing vitamins A and/or D, such for example as, cod liver oil, shark liver oil, tuna liver oil, halibut liver oil, mackerel liver oil, ling cod/liver oil, sole liver oil, spear fish liver oil, sword fish liver oil, sardine oil, whale liver oil, seal liver oil, etc. The relative proportion of oil to solvent in the mixture may vary widely; preferably the ratio of solvent to oil should be greater than one and in most cases mixtures containing between about 2% and about 25% oil are most suitable. This mixture may then be heated until the oil or the greater part thereof is dissolved in the solvent. The temperature to which the mixture of oil and solvent is heated may vary widely depending upon the nature of the ingredients contained in the mixture; in general it may be stated that it is inadvisable to heat fat-soluble vitamin-containing oils to temperatures in excess of 175° C. because of the relative instability of vitamin A at temperatures above this value. It is preferred to form the solution of oil in the solvent by first heating the solvent to be used to a predetermined temperature at which the oil to be added will substantially completely dissolve in the solvent, and then adding the oil to the solvent with agitation, the operation being carried out in an inert gas atmosphere.

The solution of the vitamin-containing oil in the solvent, prepared as hereinabove described, may then, in accordance with the process of the invention, be permitted to cool so as to effect a separation of the solution of the highly potent vitamin extract from the remainder of the oil. The temperature to which the solution is cooled may vary from about room temperature to as low as −70° C. or lower. It has been found, however, that it is preferable to cool the solution with agitation to temperatures somewhat below about 0° C., e. g. in the neighborhood of −18° C. Upon cooling, the solution separates into two layers. One layer consists chiefly of the portion of the original oil insoluble in the solvent at low temperatures which layer is usually solid depending upon the temperature to which the mass is cooled. The vitamin content of this fraction is much less than that of the original oil. This fraction has a considerably lighter color than the original oil and also has lost much of the characteristic odor possessed by many fat-soluble vitamin-containing oils. It may be saponified in the usual manner to produce vitamin concentrates substantially devoid of obnoxious tastes and odors, or it may be re-extracted in accordance with this invention to recover additional high potency vitamin fractions therefrom. Other uses to which this fraction may be put will be evident to those skilled in the art.

The solvent layer obtained upon cooling the solution may be filtered and then treated to remove the solvent therefrom, e. g. by vacuum distillation, whereby an oil is recovered having a vitamin content far in excess of the amount contained in the original oil; the percentage increase in vitamin potency may be anywhere between about 50% and about 400%, the actual increase varying with the vitamin potency of the original oil. This semi-concentrate usually has a much darker color than the original oil and possesses most of the characteristic odors and tastes and the free fatty acids thereof.

In carrying out the treatment of the semi-concentrate produced by the first extraction of the vitamin-containing marine oil, the semi-concentrate is mixed with the particular highly polar solvent to be employed. The relative proportion of oil to solvent may vary widely; the ratio of solvent to oil should be greater than 1 and preferably 2 to 20 parts of solvent to 1 part of oil. The solvent oil mass is preferably warmed to a temperature slightly or substantially above room temperature while agitating the mass. The mixture is then cooled to a temperature substantially below room temperature, e. g. −18° C. to −25° C., and the solvent layer is then separated from the resulting vitamin ester concentrate. Preferably at least 2 or 3 such extractions are carried out; the extractions preferably being carried out in an atmosphere of inert gas, e. g. nitrogen gas. The extraction of the semi-concentrate with the highly polar solvent may be carried out by a continuous extraction process at a low temperature, e. g. 0° C., if desired. This is possible because of the fact that the semi-concentrates are quite fluid at relatively low temperatures. The resulting ester concentrate may then be freed of any of the highly polar solvent entrapped therein. The highly polar solvent may be separated from the material dissolved therein, e. g. by vacuum distillation in order to recover any vitamin alcohols which may have been present in the ester concentrate. Substantially all of the free fatty acids and odor and taste constituents contained in the semi-concentrate will be found to be present with the vitamin alcohol fraction. Also a large proportion of the coloring matter contained in the semi-concentrate will be removed by the treatment with the highly polar solvent. Thus by the combination of steps constituting the process of this invention it is possible to obtain a highly potent, light-colored, bland, substantially odorless concentrate of natural vitamin esters containing practically no free fatty acids or vitamin alcohols. The vitamin A and/or D alcohols extracted by the highly polar solvent may be used for fortification of low potent vitamin oils used for such purposes as enriching poultry feeds, stock feeds, etc., where the taste and odor of the fortified material is not as important as when preparing materials for human consumption. It is thus possible to utilize all of the valuable constituents of the vitamin-containing oils to the fullest possible advantage.

For a fuller understanding of the nature and objects of the invention, reference should be had to the following examples which are given merely to further illustrate the invention and are not to be construed in a limiting sense, all parts given being by weight:

*Example 1*

100 parts of crude shark liver oil containing 103,000 U. S. P. units of vitamin A per gram were admixed with 400 parts of 99% isopropanol and the mixture warmed to 35° C. while agitating under an atmosphere of nitrogen. The solution was then cooled to −25° C. whereby two layers formed, one constituting the isopropanol solution of the semi-concentrate and the other composed essentially of solidified oil containing only a minor portion of the vitamins present in the crude oil. The solvent solution was removed from the solidified layer and the solvent removed therefrom under reduced pressure to yield the semi-concentrate. 100 parts of the semi-concentrate containing 262,000 U. S. P. units of vitamin A per gram were mixed with 400 parts of methanol and the mixture warmed to about 50° C. in the presence of nitrogen with thorough agitation. The mixture was then cooled to about −18° C. and the methanol fraction then separated from the resulting ester concentrate. Three such extraction were made and the methanol extracts combined. The methanol was then removed from the extracts and from the ester concentrate. The methanol soluble fraction which contained substantially all of the vitamin A alcohol originally present in the ester concentrate had a potency of 289,000 U. S. P. units of vitamin A per gram. It possessed a strong, fishy, characteristically concentrate odor, and was darker in color than the original ester concentrate; it also had a strong, fishy, characteristically concentrate taste. The vitamin ester concentrate which had a potency of 256,000 U. S. P. units of vitamin A per gram contained about 90% of the vitamin A originally present in the semi-concentrate, was an odorless, bland-tasting, clear liquid (clear and liquid at 3° C.) slightly lighter in color than the semi-concentrate.

*Example II*

100 parts of the semi-concentrate produced according to Example I and containing 262,000 U. S. P. units of vitamin A per gram were placed in a continuous extractor and the extraction chamber containing the semi-concentrate cooled to about 0° C. The semi-concentrate was liquid at this temperature. The semi-concentrate was then extracted by continuously circulating 95% ethanol through the cold semi-concentrate for six hours. The alcohol extract was removed and the solvent evaporated therefrom. The resulting vitamin alcohol fraction was fishy in taste and odor and contained substantially all the vitamin A alcohol associated with the original oil. The ethanol insoluble vitamin ester fraction after being freed of traces of solvent was completely without taste and odor and contained substantially the same percentage of vitamin A ester as the semi-concentrate.

*Example III*

100 parts of sole liver oil containing 292,000 U. S. P. units of vitamin A per gram were admixed with 400 parts of 99% isopropanol and the mixture heated with agitation to 40° C. The resulting solution was cooled to −18° C. whereby two layers were formed. The isopropanol solution of the semi-concentrate was removed from the solidified oil and filtered. The isopropanol solution of the semi-concentrate was subjected to distillation under reduced pressure to a point where the semi-concentrate constituted 25% of the solution. Sufficient water was added to the solution to dilute the isopropanol to 91%. The mass was then cooled to −27° C. and the resulting layers separated. The isopropanol layer contained the vitamin A alcohols, taste and odor bodies and free fatty acids. The residual layer containing the vitamin A ester concentrate was devoid of taste and odor bodies.

It is thus evident from the above description and examples that highly improved concentrates of natural vitamin esters can be readily produced. These concentrates are substantially odorless, bland, light-colored oils, liquid at relatively low temperatures, e. g. about 0° C. They have many valuable uses such as, for example, the fortification of low potency vitamin-containing oils, for fortification of products such as margarine, etc., which contain no natural vitamins; they may be used as such for providing vitamins for infants, etc., where a highly potent vitamin-containing oil is desired, etc. In view of the highly desirable characteristics of these natural vitamin ester concentrates and the wide use to which they may be put, it will be evident that they will be of wide interest to those engaged in the production and use of vitamin concentrates.

The phrase "continuous extraction" is employed in the specification and claims to connote both the usual type of continuous extraction and also what is usually referred to as counter-current extraction.

Since certain changes in carrying out the above process and certain modifications in the composition which embody the invention may be made without departing from its scope, it is intended that all matter contained in the above description shall be interpreted as illustrative and not in a limiting sense.

Having described my invention, what I claim as new and desire to secure by Letters Patent is:

1. A process of producing vitamin concentrates, one rich in vitamin esters and one rich in vitamin alcohols, which comprises contacting a fat-soluble vitamin-containing marine oil with a liquid aliphatic organic solvent miscible with marine oils at temperatures above room temperature and partially immiscible therewith at temperatures substantially below room temperature, cooling the mass to a temperature within the range of 0° C. to −70° C., separating the solvent solution of a potent vitamin semi-concentrate and extracting the semi-concentrate with a highly polar selective solvent which is characterized by being miscible with fat-soluble vitamin alcohols but immiscible with fat-soluble vitamin esters to recover a concentrate rich in vitamin alcohols, the residue being rich in vitamin esters.

2. A process of producing vitamin concentrates, one rich in vitamin esters and one rich in vitamin alcohols, which comprises contacting a fat-soluble vitamin-containing marine oil with a liquid aliphatic organic solvent miscible with marine oils at temperatures above room temperature and partially immiscible therewith at temperatures substantially below room temperature, cooling the mass to a temperature within the range of 0° C. to −70° C., separating the solvent solution of a potent vitamin semi-concentrate and separating the vitamin alcohols from the vitamin esters in the semi-concentrate by extraction with methanol.

3. A process of producing vitamin concentrates, one rich in vitamin esters and one rich in vitamin alcohols, which comprises contacting a fat-soluble vitamin-containing marine oil with a liquid aliphatic organic solvent miscible with marine oils at temperatures above room temperature and partially immiscible therewith at temperatures substantially below room temperature, cooling the mass to a temperature within the range of 0° C. to −70° C., separating the solvent solution of a potent vitamin semi-concentrate and separating the vitamin alcohols from the vitamin esters in the semi-concentrate by extraction with ethanol.

4. A process of producing vitamin concentrates one rich in vitamin esters and one rich in vitamin alcohols, which comprises contacting a fat-soluble vitamin-containing marine oil with a liquid aliphatic organic solvent miscible with marine oils at temperatures above room temperature and partially immiscible therewith at temperatures substantially below room temperature, cooling the mass to a temperature within the range of 0° C. to −70° C., separating the solvent solution of a potent vitamin semi-concentrate and separating the vitamin alcohols from the vitamin esters in the semi-concentrate by extraction with 91% isopropanol.

5. A process of producing vitamin concentrates, one rich in vitamin esters and one rich in vitamin alcohols, which comprises dissolving a fat-soluble vitamin-containing marine oil in isopropanol, cooling the mass to a temperature within the range of 0° C. to −70° C., separating the isopropanol solution of a potent vitamin semi-concentrate and extracting the semi-concentrate with a highly polar selective solvent which is characterized by being miscible with fat-soluble vitamin alcohols but immiscible with fat-soluble vitamin esters to recover a concentrate rich in vitamin alcohols, the residue being rich in vitamin esters.

6. A process of producing vitamin concentrates, one rich in vitamin esters and one rich in vitamin alcohols, which comprises dissolving a fat-soluble vitamin-containing marine oil in isopropanol, cooling the mass to a temperature within the range of 0° C. to −70° C., separating the isopropanol solution of a potent vitamin semi-concentrate and separating the vitamin alcohols from the vitamin esters in the semi-concentrate by extraction with methanol.

7. A process of producing vitamin concentrates, one rich in vitamin esters and one rich in vitamin alcohols, which comprises dissolving a fat-soluble vitamin-containing marine oil in isopropanol, cooling the mass to a temperature within the range of 0° C. to −70° C., separating the isopropanol solution of a potent vitamin semi-concentrate and separating the vitamin alcohols from the vitamin esters in the semi-concentrate by extraction with ethanol.

8. A process of producing vitamin concentrates, one rich in vitamin esters and one rich in vitamin alcohols, which comprises dissolving a fish liver oil in isopropanol, cooling the solution to induce oil separation, separating the isopropanol solution of a potent vitamin semi-concentrate, and adding water to the isopropanol solution to cause separation of a vitamin ester concentrate.

9. A process of producing vitamin concentrates, one rich in vitamin esters and one rich in vitamin alcohols, which comprises contacting a fat-soluble vitamin-containing marine oil with a liquid aliphatic organic solvent miscible with marine oils at temperatures above room temperature and partially immiscible therewith at temperatures substantially below room temperature, cooling the mass to a temperature within the range of 0° C. to −70° C., separating the solvent solution of a potent vitamin semi-concentrate and separating the vitamin alcohols from the vitamin esters in the semi-concentrate by continuous extraction thereof with a highly polar selective solvent for the vitamin alcohols.

LORAN O. BUXTON.